(12) United States Patent
Zises

(10) Patent No.: US 10,575,125 B2
(45) Date of Patent: *Feb. 25, 2020

(54) GEOFENCE BASED ON MEMBERS OF A POPULATION

(71) Applicant: eBay Inc., San Jose, CA (US)

(72) Inventor: Matthew Scott Zises, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,787

(22) Filed: Aug. 7, 2019

(65) Prior Publication Data

US 2019/0364383 A1 Nov. 28, 2019

Related U.S. Application Data

(63) Continuation of application No. 15/835,844, filed on Dec. 8, 2017, now Pat. No. 10,405,136, which is a
(Continued)

(51) Int. Cl.
*H04W 4/02* (2018.01)
*H04W 4/021* (2018.01)
(Continued)

(52) U.S. Cl.
CPC ........ *H04W 4/022* (2013.01); *G06Q 30/0261* (2013.01); *H04W 4/021* (2013.01);
(Continued)

(58) Field of Classification Search
CPC ....... H04W 4/021; H04W 4/022; H04W 4/12; H04W 4/14; H04W 8/10; H04W 8/14;
(Continued)

(56) References Cited

U.S. PATENT DOCUMENTS 6,618,593 B1 9/2003 Drutman et al.
7,835,937 B1 11/2010 Karlsson et al.
(Continued)

FOREIGN PATENT DOCUMENTS

AU 2013355371 B2 7/2015
AU 2016216630 A1 9/2016
(Continued)

OTHER PUBLICATIONS

Notice of Allowance received for Korean Patent Application No. 10-2016-7030434, dated Aug. 13, 2018, 3 pages (1 page of English Translation and 2 pages of Official Copy).
(Continued)

*Primary Examiner* — Quan M Hua
(74) *Attorney, Agent, or Firm* — SBMC

(57) ABSTRACT

In one embodiment, a method comprises receiving, via a mobile station, contextual information or geographic location data relating to a plurality of members of the population within the geographic region, identifying a common element in the received contextual information relating to at least two members of the population as a basis for defining a geofence to include the at least two members, wherein the common element is identified upon a comparison of the first and second contextual information, and defining the boundary of the geofence.

20 Claims, 7 Drawing Sheets

Related U.S. Application Data continuation of application No. 15/450,565, filed on Mar. 6, 2017, now Pat. No. 9,867,000, which is a continuation of application No. 15/216,074, filed on Jul. 21, 2016, now Pat. No. 9,591,445, which is a continuation of application No. 13/693,145, filed on Dec. 4, 2012, now Pat. No. 9,432,806.

(51) Int. Cl.
*H04W 4/21* (2018.01)
*H04W 4/08* (2009.01)
*G06Q 30/02* (2012.01)
*G06Q 50/00* (2012.01)

(52) U.S. Cl.
CPC .............. *H04W 4/08* (2013.01); *H04W 4/21* (2018.02); *G06Q 50/01* (2013.01)

(58) Field of Classification Search
CPC ......... H04W 92/08; H04W 4/02; H04W 4/21; H04W 4/48; G06Q 30/0205; G06Q 30/0201; G06Q 30/0241; G06Q 30/0261; G06Q 30/02; G06Q 30/0238; G06Q 30/0259; G06Q 30/0623; G06Q 30/0631; G06Q 30/0639; G06Q 30/0641; G06Q 30/08; H04L 63/0428; H04L 63/08; H04L 67/18; H04L 67/22

See application file for complete search history.

(56) References Cited

U.S. PATENT DOCUMENTS

| | | | |
|---|---|---|---|
| 7,848,765 | B2 | 12/2010 | Phillips et al. |
| 8,295,854 | B2 | 10/2012 | Osann, Jr. |
| 8,755,824 | B1 | 6/2014 | Wang et al. |
| 8,782,560 | B2 | 7/2014 | Purdy et al. |
| 9,043,222 | B1 | 5/2015 | Kerr et al. |
| 9,116,818 | B2 | 8/2015 | Bilange et al. |
| 9,200,901 | B2 | 12/2015 | Khosravy et al. |
| 9,398,409 | B2 | 7/2016 | Porter |
| 9,432,806 | B2 | 8/2016 | Zises |
| 9,565,523 | B1 | 2/2017 | Steger et al. |
| 9,591,445 | B2 | 3/2017 | Zises |
| 9,736,636 | B1 | 8/2017 | DeLuca et al. |
| 9,867,000 | B2 | 1/2018 | Zises |
| 10,318,990 | B2 | 6/2019 | Jain et al. |
| 10,405,136 | B2 | 9/2019 | Zises |
| 2003/0096621 | A1 | 5/2003 | Jana et al. |
| 2006/0270421 | A1 | 11/2006 | Phillips et al. |
| 2007/0027768 | A1 | 2/2007 | Collins et al. |
| 2007/0162328 | A1 | 7/2007 | Reich |
| 2008/0026771 | A1 | 1/2008 | Hill |
| 2008/0040219 | A1 | 2/2008 | Kim et al. |
| 2008/0160956 | A1 | 7/2008 | Jackson et al. |
| 2008/0162032 | A1 | 7/2008 | Wuersch et al. |
| 2008/0248815 | A1 | 10/2008 | Busch |
| 2008/0268876 | A1 | 10/2008 | Gelfand et al. |
| 2009/0061884 | A1 | 3/2009 | Rajan et al. |
| 2009/0063274 | A1 | 3/2009 | Dublin et al. |
| 2009/0064144 | A1 | 3/2009 | Abhyanker |
| 2009/0094093 | A1 | 4/2009 | Phan |
| 2009/0094196 | A1 | 4/2009 | Piwowarski et al. |
| 2009/0286553 | A1 | 11/2009 | Northway et al. |
| 2009/0319178 | A1 | 12/2009 | Khosravy et al. |
| 2010/0023407 | A1 | 1/2010 | Grady et al. |
| 2010/0036711 | A1 | 2/2010 | Shenfield et al. |
| 2010/0138295 | A1 | 6/2010 | Caron et al. |
| 2010/0159904 | A1 | 6/2010 | Colligan et al. |
| 2010/0203901 | A1 | 8/2010 | Dinoff et al. |
| 2010/0241512 | A1 | 9/2010 | Tirpak et al. |
| 2010/0262449 | A1 | 10/2010 | Monteforte et al. |
| 2010/0274680 | A1 | 10/2010 | Carlson et al. |
| 2010/0332324 | A1 | 12/2010 | Khosravy et al. |
| 2011/0004501 | A1 | 1/2011 | Pradhan et al. |
| 2011/0137813 | A1 | 6/2011 | Stewart |
| 2011/0145089 | A1 | 6/2011 | Khunger et al. |
| 2011/0153426 | A1 | 6/2011 | Reddy et al. |
| 2012/0008526 | A1 | 1/2012 | Borghei |
| 2012/0030007 | A1 | 2/2012 | Ye |
| 2012/0047565 | A1 | 2/2012 | Petersen |
| 2012/0054001 | A1 | 3/2012 | Zivkovic et al. |
| 2012/0074565 | A1 | 3/2012 | Koroku |
| 2012/0109744 | A1 | 5/2012 | Yeh et al. |
| 2012/0123852 | A1 | 5/2012 | Noh |
| 2012/0126998 | A1 | 5/2012 | Morgan et al. |
| 2012/0166520 | A1 | 6/2012 | Lindsay et al. |
| 2012/0173370 | A1 | 7/2012 | Soroca et al. |
| 2012/0265585 | A1 | 10/2012 | Muirbrook et al. |
| 2012/0276928 | A1 | 11/2012 | Shutter |
| 2012/0302258 | A1 | 11/2012 | Pai et al. |
| 2012/0310527 | A1 | 12/2012 | Yariv et al. |
| 2013/0060641 | A1 | 3/2013 | Al Gharabally |
| 2013/0073388 | A1 | 3/2013 | Heath |
| 2013/0085860 | A1 | 4/2013 | Summers et al. |
| 2013/0099977 | A1 | 4/2013 | Sheshadri et al. |
| 2013/0326137 | A1 | 12/2013 | Bilange et al. |
| 2013/0332274 | A1 | 12/2013 | Faith et al. |
| 2014/0025432 | A1 | 1/2014 | Thomassen et al. |
| 2014/0057648 | A1 | 2/2014 | Lyman et al. |
| 2014/0095296 | A1 | 4/2014 | Angell et al. |
| 2014/0155094 | A1 | 6/2014 | Zises |
| 2014/0156410 | A1 | 6/2014 | Wuersch et al. |
| 2014/0162692 | A1 | 6/2014 | Li et al. |
| 2015/0039393 | A1 | 2/2015 | Jain |
| 2015/0213481 | A1 | 7/2015 | Yuan |
| 2015/0269624 | A1 | 9/2015 | Cheng et al. |
| 2015/0278865 | A1 | 10/2015 | Jain et al. |
| 2015/0371270 | A1 | 12/2015 | Mcdevitt et al. |
| 2016/0048857 | A1 | 2/2016 | Jain et al. |
| 2016/0330583 | A1 | 11/2016 | Zises |
| 2017/0180932 | A1 | 6/2017 | Zises |
| 2018/0109919 | A1 | 4/2018 | Zises |
| 2019/0244249 | A1 | 8/2019 | Jain et al. |

FOREIGN PATENT DOCUMENTS

| | | |
|---|---|---|
| AU | 2016216630 B2 | 5/2017 |
| CN | 1967527 A | 5/2007 |
| CN | 101374274 A | 2/2009 |
| CN | 102291435 A | 12/2011 |
| CN | 104040577 A | 9/2014 |
| CN | 104969219 A | 10/2015 |
| CN | 105528384 A | 4/2016 |
| CN | 106165463 A | 11/2016 |
| CN | 109034918 A | 12/2018 |
| CN | 109034919 A | 12/2018 |
| CN | 109040972 A | 12/2018 |
| EP | 2518678 A1 | 10/2012 |
| KR | 1020120035163 A | 4/2012 |
| KR | 1020120037541 A | 4/2012 |
| KR | 1020120069618 A | 6/2012 |
| WO | 2008/134595 A1 | 11/2008 |
| WO | 2012/000107 A1 | 1/2012 |
| WO | 2013/052316 A1 | 4/2013 |
| WO | 2013/188409 A1 | 12/2013 |
| WO | 2014/055571 A1 | 4/2014 |
| WO | 2014/085657 A1 | 6/2014 |
| WO | 2014/089161 A2 | 6/2014 |
| WO | 2014/089161 A3 | 10/2014 |
| WO | 2015/153721 A1 | 10/2015 |

OTHER PUBLICATIONS

Office Action received for Korean Patent Application No. 10-2016-7030434, dated Feb. 23, 2018, 5 pages (2 pages of English Translation and 3 pages of Official Copy).

Notice of Allowance received for Korean Patent Application No. 10-2018-7020841, dated Jan. 17, 2019, 3 pages (1 page of English Translation and 2 pages of Official Copy).

Final Office Action Received for Korean Patent Application No. 10-2018-7032783, dated Aug. 6, 2019, 7 pages (3 pages of English Translation and 4 page of Official Copy).

(56) References Cited

OTHER PUBLICATIONS

Response to Office Action filed Aug. 27, 2019, for Korean Patent Application No. 10-2019-7010898, dated Jul. 1, 2019, 11 pages ( 3 pages of English translation & 8 Pages of Official Copy).
Response to Communication Pursuant to Article 94(3) EPC filed on May 6, 2017, for European Patent Application No. 13860378.2, dated Apr. 26, 2019, 1 page.
Advisory Action received for U.S. Appl. No. 14/242,563, dated Feb. 12, 2018, 3 pages.
Applicant Initiated Interview Summary received for U.S. Appl. No. 14/242,563, dated Jan. 31, 2018, 3 pages.
Response to Final Office Action filed Jan. 30, 2018, for U.S. Appl. No. 14/242,563, dated Dec. 1, 2017, 24 pages.
Applicant Interview summary received for U.S. Appl. No. 14/458,045, dated Aug. 27, 2019, 3 pages.
Response to Final Office Action filed Aug. 14, 2019, for U.S. Appl. No. 14/458,045, dated May 15, 2019, 17 pages.
Advisory Action Received for U.S. Appl. No. 15/835,844 dated Mar. 15, 2019, 4 pages.
Final Office Action Received for U.S. Appl. No. 15/835,844 dated Jan. 10, 2019, 14 pages.
Non-Final Office Action received for U.S. Appl. No. 15/835,844, dated Sep. 10, 2018, 13 pages.
Notice of Allowance received for U.S. Appl. No. 15/835,844, dated Apr. 12, 2019, 16 pages.
Preliminary Amendment for U.S. Appl. No. 15/835,844, filed Dec. 29, 2017, 8 pages.
Response to Final Office Action filed Mar. 6, 2019, for U.S. Appl. No. 15/835,844, dated Jan. 10, 2019, 13 pages.
Response to Non-Final Office Action filed Dec. 7, 2018, for U.S. Appl. No. 15/835,844, dated Sep. 10, 2018, 13 pages.
Response to Supplemental Final Office Action filed Mar. 12, 2019 for U.S. Appl. No. 15/835,844, dated Jan. 10, 2019, 13 pages.
Notice of Decision to Grant received for Chinese Patent Application No. 201380072150.7, dated Jul. 18, 2018, 4 pages (2 pages of English Translation and 2 pages of Official copy).
Notice of Decision to Grant Received for Chinese Patent Application No. 201580017648.2, dated Aug. 29, 2019, 4 pages.
Response to Office Action filed Jul. 17, 2019 for Chinese Patent Application No. 201580017648.2 dated Mar. 5, 2019, 22 pages. (8 pages of English translation and 14 pages of official copy).
Office Action received for Korean Patent Application No. 10-2017-7026574, dated Oct. 31, 2017, 5 pages (2 pages of English Translation and 3 pages of Official Copy).
Response to Office Action filed Dec. 28, 2017 for Korean Patent Application No. 10-2017-7026574, dated Oct. 31, 2017, 24 pages (17 pages of Official Copy and 7 pages of English Claims).
Response to Non-Final Office Action filed Dec. 22, 2014 for U.S. Appl. No. 13/674,003, dated Sep. 22, 2014, 19 pages.
Extended European Search Report received for European Patent Application No. 13860378.2, dated Jun. 22, 2016, 10 pages.
Non-Final Office Action received for U.S. Appl. No. 14/242,563, dated Oct. 10, 2018, 44 pages.
Non-Final Office Action received for U.S. Appl. No. 14/458,045, dated Oct. 5, 2018, 20 pages.
Office Action received for Chinese Patent Application No. 201380072150.7, dated Jun. 27, 2017, 21 pages (10 pages of Official Copy and 11 pages of English Translation).
Office Action received for Chinese Patent Application No. 201380072150.7, dated Dec. 5, 2017, 6 pages (3 pages English Translation and 3 pages Official Copy).
Response to Office Action filed Nov. 13, 2017, for Chinese Patent Application No. 201380072150.7, dated Jun. 27, 2017, 18 pages (8 pages of pending claims and 10 pages Official Copy).
Office Action received for Chinese Patent Application No. 201580017648.2, dated Mar. 5, 2019, 19 pages (9 pages of Official Copy and 10 pages of English Translation).
U.S. Appl. No. 13/693,145, filed Dec. 4, 2012, Issued.
U.S. Appl. No. 15/216,074, filed Jul. 21, 2016, Issued.
U.S. Appl. No. 15/450,565, filed Mar. 6, 2017, Issued.
U.S. Appl. No. 15/835,844, filed Dec. 8, 2017, Issued.
Applicant Interview Summary received for U.S. Appl. No. 14/242,563, dated Oct. 2, 2017, 3 pages.
Corrected Notice of Allowability received for U.S. Appl. No. 14/242,563, dated Apr. 3, 2019, 2 pages.
Corrected Notice of Allowability received for U.S. Appl. No. 14/242,563, dated Mar. 7, 2019, 8 pages.
Corrected Notice of Allowability received for U.S. Appl. No. 14/242,563, dated May 8, 2019, 3 pages.
Final Office Action received for U.S. Appl. No. 14/242,563, dated Dec. 1, 2017, 39 pages.
Final Office Action received for U.S. Appl. No. 14/242,563, dated Mar. 16, 2016, 38 pages.
Non-Final Office Action received for U.S. Appl. No. 14/242,563, dated Mar. 29, 2017, 41 pages.
Non-Final Office Action received for U.S. Appl. No. 14/242,563, dated Oct. 19, 2015, 36 pages.
Notice of Allowance received for U.S. Appl. No. 14/242,563, dated Feb. 21, 2019, 11 pages.
Response to Non-Final Office Action filed Jan. 19, 2016 for U.S. Appl. No. 14/242,563, dated Oct. 19, 2015, 19 pages.
Response to Non-Final Office Action filed Jun. 16, 2016, for U.S. Appl. No. 14/242,563, dated Mar. 16, 2016, 19 pages.
Response to Non-Final Office Action filed Nov. 28, 2018, for U.S. Appl. No. 14/242,563, dated Oct. 10, 2018, 34 pages.
Response to Non-Final Office Action filed Sep. 28, 2017, for U.S. Appl. No. 14/242,563, dated Mar. 29, 2017, 19 pages.
Final Office Action received for U.S. Appl. No. 14/458,045, dated May 15, 2019, 19 pages.
Final Office Action received for U.S. Appl. No. 14/458,045 dated Jan. 3, 2018, 17 pages.
Non-Final Office Action received for U.S. Appl. No. 14/458,045, dated Mar. 22, 2017, 14 pages.
Response to Final Office Action filed Apr. 2, 2018, for U.S. Appl. No. 14/458,045, dated Jan. 3, 2018, 22 pages.
Response to Non-Final Office Action filed Jan. 7, 2019, for U.S. Appl. No. 14/458,045, dated Oct. 5, 2018, 13 pages.
Response to Non-Final Office Action filed Sep. 20, 2017, for U.S. Appl. No. 14/458,045, dated Mar. 22, 2017, 17 pages.
Non-Final Office Action received for U.S. Appl. No. 15/216,074, dated Sep. 28, 2016, 19 pages.
Notice of Allowance received for U.S. Appl. No. 15/216,074, dated Oct. 24, 2016, 8 pages.
Preliminary Amendment for U.S. Appl. No. 15/216,074, filed Jul. 22, 2016, 9 pages.
Response to Non-Final Office Action filed Oct. 6, 2016 for U.S. Appl. No. 15/216,074, dated Sep. 28, 2016, 9 pages.
Non-Final Office Action received for U.S. Appl. No. 15/450,565, dated Apr. 17, 2017, 10 pages.
Notice of Allowance received for U.S. Appl. No. 15/450,565, dated Sep. 13, 2017, 9 pages.
Preliminary Amendment for U.S. Appl. No. 15/450,565, filed Apr. 4, 2017, 9 pages.
Response to Non-Final Office Action filed Jun. 1, 2017, for U.S. Appl. No. 15/450,565, dated Apr. 17, 2017, 8 pages.
Office Action received for Canadian Patent Application No. 2,893,934, dated Nov. 2, 2017, 3 pages.
Office Action received for Canadian Patent Application No. 2,893,934, dated Nov. 22, 2016, 3 pages.
Office Action received for Canadian Patent Application No. 2,893,934, dated Sep. 29, 2015, 4 pages.
Response to Office Action filed Apr. 23, 2018, for Canada Patent Application No. 2,893,934, dated Nov. 2, 2017, 9 pages.
Response to Office Action filed Mar. 22, 2016 for Canadian Patent Application No. 2,893,934, dated Sep. 29, 2015, 26 pages.
Response to Office Action filed May 17, 2017, for Canadian Patent Application No. 2,893,934, dated Nov. 22, 2016, 28 pages.
First Examiner Report received for Australian Patent Application No. 2013352130, dated Mar. 11, 2016, 5 pages.
First Examination Report received for Australian Patent Application No. 2013355371, dated Mar. 11, 2016, 3 pages.

(56) References Cited

OTHER PUBLICATIONS

Response to First Examination Report filed Apr. 19, 2016 for Australian Patent Application No. 2013355371, dated Mar. 11, 2016, 24 pages.
Response to Office Action filed Feb. 12, 2018 for Chinese Patent Application No. 201380072150.7, dated Dec. 5, 2017, 16 pages. (9 pages of Official Copy and 7 pages of English claims).
International Preliminary Report on Patentability received for PCT Application No. PCT/US2013/072339, dated Jun. 11, 2015, 7 pages.
First Examination Report received for Australian Patent Application No. 2016216630, dated Jan. 12, 2017, 3 pages.
Response to First Examination Report filed Apr. 24, 2017 for Australian Patent Application No. 2016216630, dated Jan. 12, 2017, 15 pages.
Google Play, "Moovit-Real-time Transit Info.—Android Apps on Google Play", Retrieved from the Internet: <URL: https://play.google.com/store/apps/details?id=com .tranzmate&h1=en>, Aug. 2, 2017, 2 pages.
International Preliminary Report on Patentability received for PCT Application No. PCT/US2013/062938, dated Apr. 16, 2015, 11 pages.
International Search Report received for PCT Application No. PCT/US2013/062938, dated Jan. 16, 2014, 2 pages.
Written Opinion received for PCT Application No. PCT/US2013/062938, dated Jan. 16, 2014, 10 pages.
International Search Report received for PCT Application No. PCT/US2013/072339, dated Apr. 28, 2014, 5 pages.
Invitation to Pay Additional Fees and Partial Search Report received for PCT Application No. PCT/US2013/072339, dated Feb. 14, 2014, 2 pages.
Written Opinion received for PCT Application No. PCT/US2013/072339, dated Apr. 28, 2014, 5 pages.
International Preliminary Report on Patentability received for PCT Application No. PCT/US2013/073021, dated Jun. 18, 2015, 8 pages.
International Search Report received for PCT Application No. PCT/US2013/073021, dated Aug. 22, 2014, 2 pages.
"TSO Mobile & Public Transportation: Tracking, Management and Logistic Solutions", Aug. 25, 2014, 4 pages.
Notice of Allowance received for Korean Patent Application No. 10-2015-7017576, dated May 9, 2016, 3 pages (1 page of English Translation and 2 pages of Official Copy).
Notice of Allowance received for Korean Patent Application No. 10-2016-7021649, dated Jun. 22, 2017, 3 pages (1 page of English Translation and 2 pages of Official Copy).
Office Action received for Korean Patent Application No. 10-2016-7021649, dated Feb. 10, 2017, 6 pages. (3 pages of English translation & 3 pages of Official Copy).
Office Action received for Korean Patent Application No. 10-2016-7021649, dated Oct. 14, 2016, 5 pages. (3 pages of English Translation 2 pages of official copy).
Response to Office Action filed Apr. 10, 2017 for Korean Patent Application No. 10-2016-7021649, dated Feb. 10, 2017, 17 pages (11 pages of Official Copy 4 pages of English Pending Claims).
Response to Office Action filed Dec. 14, 2016 for Korean Patent Application No. 10-2016-7021649, dated Oct. 14, 2016, 16 pages (12 pages of Official Copy 4 pages of English Pending Claims).
Office Action received for Korean Patent Application No. 10-2016-7030434, dated Aug. 2, 2017, 11 pages (6 pages of English Translation and 5 pages of Official Copy).
Response to Office Action filed Apr. 20, 2018, for Korean Patent Application No. 10-2016-7030434, dated Feb. 23, 2018, 14 pages (9 pages of Official Copy and 5 pages of English Translation).
Response to Office Action filed Sep. 29, 2017 for Korean Patent Application No. 10-2016-7030434, dated Aug. 2, 2017, 15 pages (10 pages of Official Copy and 5 pages of English Translation).
Notice of Allowance received for Korean Patent Application No. 10-2017-7026574, dated Apr. 20, 2018, 3 pages (1 page of English Translation and 2 pages of Official Copy).
Office Action received for Korean Patent Application No. 10-2018-7020841, dated Oct. 2, 2018, 8 pages (4 pages of English Translation and 4 pages Official copy).
Response to Office Action filed Dec. 3, 2018, for Korean Patent Application No. 10-2018-7020841, dated Oct. 2, 2018, 18 pages(3 pages of English Pending Claims and 15 pages of Official Copy).
Office Action received for Korean Patent Application No. 10-2018-7032783, dated Feb. 7, 2019, 10 pages (5 pages of English Translation and 5 pages of Official Copy).
Response to Office Action filed Apr. 8, 2019, for Korean Patent Application No. 10-2018-7032783, dated Feb. 7, 2019, 16 pages. (11 pages of Official copy and 5 pages of English Translation).
Office Action Received for Korean Patent Application No. 10-2019-7010898 dated Jul. 1, 2019, 8 pages.(4 pages of Official copy and 4 pages of English Translation).
Applicant initiated interview received for U.S. Appl. No. 13/674,003, dated Jan. 5, 2015, 3 pages.
Applicant Initiated Interview Summary received for U.S. Appl. No. 13/674,003, dated Apr. 27, 2016, 4 pages.
Applicant Initiated Interview Summary received for U.S. Appl. No. 13/674,003, dated Jul. 10, 2015, 3 pages.
Final Office Action received for U.S. Appl. No. 13/674,003, dated Aug. 18, 2016, 7 pages.
Final Office Action received for U.S. Appl. No. 13/674,003, dated May 7, 2015, 21 pages.
Non-Final Office Action received for U.S. Appl. No. 13/674,003, dated Jan. 25, 2016, 20 pages.
Non-Final Office Action received for U.S. Appl. No. 13/674,003, dated Sep. 22, 2014, 19 pages.
Response to Non-Final Office Action filed Apr. 25, 2016 for U.S. Appl. No. 13/674,003, dated Jan. 25, 2016, 12 pages.
Final Office Action received for U.S. Appl. No. 13/691,390, dated Nov. 6, 2015, 15 pages.
Non-Final Office Action received for U.S. Appl. No. 13/691,390, dated Jul. 10, 2015, 13 pages.
Applicant Initiated Interview Summary received for U.S. Appl. No. 13/691,390, dated Mar. 8, 2016, 3 pages.
Response to Final Office Action filed Mar. 7, 2016 for U.S. Appl. No. 13/691,390, dated Nov. 6, 2015, 11 pages.
Non-Final Office Action received for U.S. Appl. No. 13/691,390, dated Jun. 9, 2016, 21 pages.
Response to Restriction Requirement filed May 26, 2015, for U.S. Appl. No. 13/691,390, dated Feb. 26, 2015, 10 pages.
Response to Non-Final Office Action filed Oct. 13, 2015, for U.S. Appl. No. 13/691,390, dated Jul. 10, 2015, 12 pages.
Restriction Requirement received for U.S. Appl. No. 13/691,390, dated Feb. 26, 2015, 9 pages.
Applicant Initiated Interview Summary for U.S. Appl. No. 13/691,390, dated Oct. 19, 2015, 3 pages.
Appeal Brief for U.S. Appl. No. 13/693,145, filed Oct. 13, 2015, 25 pages.
Final Office Action received for U.S. Appl. No. 13/693,145, dated Jul. 1, 2015, 19 pages.
Non-Final Office Action received for U.S. Appl. No. 13/693,145, dated Aug. 14, 2014, 15 pages.
Non-Final Office Action received for U.S. Appl. No. 13/693,145, dated Feb. 17, 2015, 19 pages.
Notice of Allowance received for U.S. Appl. No. 13/693,145, dated Apr. 8, 2016, 13 pages.
Notice of Allowance received for U.S. Appl. No. 13/693,145, dated Apr. 26, 2016, 8 pages.
Response to Non-Final Office Action filed Jan. 30, 2015, for U.S. Appl. No. 13/693,145, dated Aug. 14, 2014, 14 pages.
Response to Non-Final Office Action filed May 14, 2015, for U.S. Appl. No. 13/693,145, dated Feb. 17, 2015, 14 pages.
Communication Pursuant to Article 94(3) EPC received for European Patent Application No. 13860378.2, dated Apr. 26, 2019, 10 pages.
Response to Extended European Search Report filed Dec. 14, 2016 for European Patent Application No. 13860378.2, dated Jun. 22, 2016, 13 pages.
Applicant Initiated Interview Summary received for U.S. Appl. No. 14/242,563, dated Nov. 8, 2018, 3 pages.

(56) References Cited

OTHER PUBLICATIONS

Applicant Interview Summary received for U.S. Appl. No. 14/242,563, dated May 20, 2016, 3 pages.
Applicant Interview Summary received for U.S. Appl. No. 14/242,563, dated Nov. 25, 2015, 3 pages.
International Search Report received for PCT Application No. PCT/US2015/023806, dated Jul. 6, 2015, 2 pages.
International Written Opinion received for PCT Application No. PCT/US2015/023806, dated Jul. 6, 2015, 7 pages.
International Written Opinion received for PCT Application No. PCT/US2013/073021, dated Aug. 22, 2014, 6 pages.
International Preliminary Report on Patentability received for PCT Application No. PCT/US2015/023806, dated Oct. 13, 2016, 9 pages.
Response to Final Office Action filed Jul. 6, 2015, for U.S. Appl. No. 13/674,003, dated May 7, 2015, 16 pages.
"Invitation to Pay Additional Fees and Partial Search Report received for PCT Application No. PCT/US2013/072339, dated Feb. 14, 2014", , Feb. 14, 2014, 2 pages.
"Written Opinion received for PCT Application No. PCT/US2013/072339, dated Apr. 28, 2014", , Apr. 28, 2014, 5 pages.
"International Preliminary Report on Patentability received for PCT Application No. PCT/US2013/073021, dated Jun. 18, 2015", , Jun. 18, 2015, 8 pages.
"International Search Report received for PCT Application No. PCT/US2013/073021, dated Aug. 22, 2014", , Aug. 22, 2014, 2 pages.
"International Written Opinion received for PCT Application No. PCT/US2013/073021, dated Aug. 22, 2014", , Aug. 22, 2014, 6 pages.
"International Preliminary Report on Patentability received for PCT Application No. PCT/US2015/023806, dated Oct. 13, 2016", , Oct. 13, 2016, 9 pages.
"International Search Report received for PCT Application No. PCT/US2015/023806, dated Jul. 6, 2015", , Jul. 6, 2015, 2 pages.
"International Written Opinion received for PCT Application No. PCT/US2015/023806, dated Jul. 6, 2015", , Jul. 6, 2015, 7 pages.
Notice of Allowance received for Korean Patent Application No. 10-2018-7032783, dated Oct. 24, 2019, 4 pages (3 pages of Original Copy and 1 page of English Translation).
Response to Office Action filed Oct. 1, 2019 for Korean Patent Application No. 10-2018-7032783, dated Aug. 6, 2019, 13 pages (8 pages of Official Copy & 5 pages of English Pending Claims).

GEOFENCE BASED ON MEMBERS OF A POPULATION

RELATED APPLICATIONS

This application is a continuation of and claims priority to U.S. patent application Ser. No. 15/835,844, filed on Dec. 8, 2017, which is a continuation of U.S. Pat. No. 9,867,000, issued on Jun. 22, 2017, which is a continuation of U.S. Pat. No. 9,591,445, issued on Nov. 10, 2016, which is a continuation of U.S. Pat. No. 9,432,806, issued on Jun. 5, 2014, the disclosures of which are incorporated in their entirety by reference herein.

TECHNICAL FILED

This application relates generally to data processing within a network-based system operating over a distributed network, and more specifically to systems and methods for implementing a dynamic geofence based on the geo-locations, identified attributes or desired populations of members within the dynamic geofence.

BACKGROUND

The ever increasing use of smart phones, such as the iPhone® (from Apple, Inc. of Cupertino Calif.), with data connections and location determination capabilities is slowly changing the way people interact, shop for products and services, and even manage accounts. Smart phones can provide users with nearly instant information regarding a wide range of information, such as product availability, friend locations, or pricing. For example, applications such as RedLaser™ (from eBay, Inc. of San Jose, Calif.) allow a smart phone user to scan a bar code and instantly check prices across online and local retail outlets. Smart phones also commonly include mechanisms, such as global positioning system (GPS) receivers, that allow the devices to constantly update location information. These technology changes are also driving changes in the way groups of people interact and exchange information.

SUMMARY

In an example embodiment, a system comprises at least one module, executing on one or more computer processors, to receive, via a first portable electronic device, contextual information and a geolocation relating to a first user in a network-based system; receive, via second portable electronic device, contextual information and a geolocation relating to a second user in the network-based system; identify a common element in the received contextual information relating to the first user, and the received contextual information relating to the second user; and in response to an identification of the common element, defining a boundary for a geofence based on the geolocation of the first or second users.

In another example embodiment, a machine readable medium, includes instructions, which when performed by a machine, causes the machine to perform the operations of receiving, via a first portable electronic device, contextual information and a geolocation relating to a first user in a network-based system; receiving, via second portable electronic device, contextual information and a geolocation relating to a second user in the network-based system; identifying a common element in the received contextual information relating to the first user, and the received contextual information relating to the second user; and in response to an identification of the common element, defining a boundary for a geofence based on the geolocation of the first or second users.

In an example embodiment, a system comprises at least one mobile station deployable into a geographic region of a network-based system, the mobile station to facilitate definition of a boundary of a geofence surrounding a population of member s connected to the network-based system located within the geographic region; and at least one module, executing on one or more computer processors, to receive, via the at least one mobile station, contextual information relating to a plurality of member s of the population within the geographic region; identify a common element in the received contextual information relating to at least two members of the population as a basis for defining a first boundary of the geofence to include the at least two members; and define the first boundary of the geofence.

In another example embodiment, a machine readable medium, includes instructions, which when performed by a machine, causes the machine to perform the operations of receiving, via one or more mobile stations, contextual information relating to a plurality of member s of the population within a geographic region of a network-based system, the one or more mobile stations deployable into the geographic region to facilitate the definition of a boundary of a geofence surrounding a population of members connected to the network-based system located within the geographic region; identifying a common element in the received contextual information relating to at least two member s of the population as a basis for defining a first boundary of the geofence to include the at least two members; and defining the first boundary of the geofence.

BRIEF DESCRIPTION OF THE DRAWINGS

Some embodiments are illustrated by way of example and not limitation in the figures of the accompanying drawings in which.

DEFINITIONS

Figure 1:
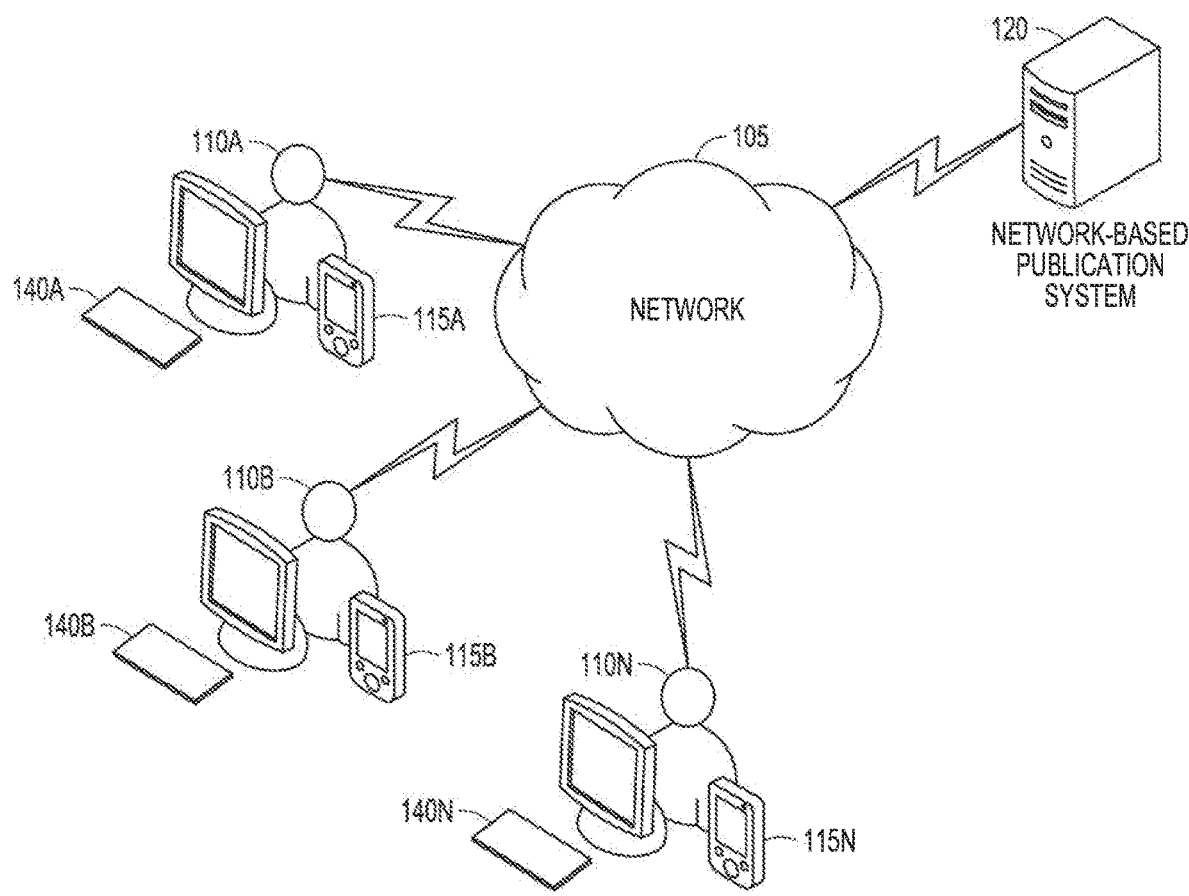
FIG. 1 is a block diagram depicting a system for creating a dynamic geofence, according to an example embodiment.

Geolocation—For the purposes of this specification and the associated claims, the term "geolocation" is used to refer to a geographic location, such as a longitude/latitude combination or a street address, or a region defined by a ZIP code, for example. The term geolocation or location is also used within this specification and claims in reference to a physical location, for example associated with a retail outlet (e.g., store), a movie theater location, or a dining house.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Contextual information—For the purposes of this specification and the associated claims, the term "contextual information" is used to refer to environmental data, such as time and weather conditions, among others. The contextual information generally refers to conditions describing an individual's (e.g., user, member of population etc.) environment and/or activities. For example, contextual information can include a user's direction of movement, current activity (e.g., working, driving, playing golf, shopping, attending a pop concert, lining up for show tickets etc.), current weather conditions, time of day, and time of year (e.g., season), among other things. In certain examples, contextual information about a user can also include past events, purchase history, or other historical data about the user. In other examples, contextual information can include demographic information about an individual (e.g. income level, gender, ethnicity, and so forth).

Common element—For the purposes of this specification and the associated claims, a "common element" identified in contextual information relating to respective users means each set of user information includes that common element. The element is common to the user sets. Examples of common elements are given below.

Mobile station—includes a human person, a device, a vehicle or a conveyance carrying or operating a portable electronic device in communication with a network-based system.

DETAILED DESCRIPTION

Some example embodiments of systems and methods for implementing a dynamic geofence are described herein. The systems and methods may serve in some examples to improve the experience of operators of electronic marketplaces or marketing operations in offering goods or services to defined or targeted populations of users on a dynamic basis. In other examples, implementation of a geofence may be akin to a person-to-person (P2P) situation in which, for example, three people (or mobile stations) fall within a certain distance from each other within a general region and are able to then create a dynamic geofence in which anyone inside the geofence can receive offers. As people leave or enter the region, the geofence can be redefined accordingly. In some examples, people with similar characteristics can receive offers. The characteristics would form part of contextual information relating to those people, as defined above. Additional people who might fit the criteria can become an additional link in the geofence and affect its shape.

A definition of a "common element" is provided above. In some examples, the common element may be specific in nature, such as for example a specific performance of a Batman movie being shown at a particular time at a particular location, or may relate to an annual income level greater than a defined number. In other words, if for example two users connected to a network are both attending a Batman movie being shown at a particular time at a particular location, then contextual information relating to those two members would contain the "common element" of that performance of the Batman movie. The contextual information and/or geo-location data may be received automatically from portable electronic devices operated by the users (in our example, two people, but other numbers are possible, including many thousands of people, or more), or may be received from portable electronic devices operated by other users observing the two users and manually transmitting contextual information and/or a geolocation relating to the two users. In this example, the other users would fall within the definition of "mobile stations" set out above. In some examples, the common element may be more general in nature and relate, for example, to a general number of Bruce Springsteen concerts performed during a holiday season without being limited to particular times or locations. A common element in respective sets of contextual information relating to users making reservations for such concerts might generally be "Bruce Springsteen".

A common element may in some examples have relative degrees of similarity. For example, the common element may lie within a defined range of contextual information relating to users. In a shopping mall attended by users making purchases of goods, a range of leather jacket colors might include for example "red" as being relatively similar to "pink" and thus a common element of red or pink hues would be present in a defined range of colors within a set of contextual information relating to users purchasing leather jackets. In another example, Bruce Springsteen may be said to be similar to David Bowie in that both are performers of rock music even though the two are different persons. Thus a "rock music performer" might be an element common to sets of contextual information relating to attendees at Springsteen and Bowie rock concerts, for example.

A common element may thus be defined or identified in many different ways. A common element may be defined or identified manually, for example by a human person observing attendees lining up to attend a rock concert, or the common element may be identified or defined electronically through the electronic comparison of contextual information, for example.

In some situations, the seller of a good or service might want to limit the numbers of on-line offers made to potential customers within a region. A geofence can be implemented according to the present subject matter within the region to include a defined population of members each receiving an offer. The geofence can be defined dynamically to include a decreased geographic size or population of members so as to limit the exposure of the offer, or in other situations increase the number of members receiving the offer. In some examples, a seller or marketer may want very extensive exposure for the offer but only in situations where there is significant density of people the seller or marketer is trying to reach. The present disclosure allows the geofence to be created and grow as more people with desired target characteristics enter the geofence. In some forms, the geofence may be said to exhibit "viral" characteristics.

In some examples, a seller of goods may wish to extend a promotional offer to a limited population of persons attending a Bruce Springsteen concert at a particular location, for example. Many of the attendees may be users connected to a network based system using portable electronic devices, such as smartphones or iPhones for example. Contextual information and/or a geolocation may be received, via the connected devices on the network, relating to one or more of the attendees. The received contextual information may include a common element, such as attendance at the Springsteen concert at that particular location. Other common elements are possible. A boundary of a geofence may then be defined based on identification of the common element or a geolocation of one of the attendees. The contextual information may be received via a portable electronic device from an observer or a connected user that might not necessarily be attending the concert. The observer may place himself or herself in or adjacent the crowd of concert attendees and communicate with the network to transmit a geolocation or observed contextual information. In some examples, an army of observers may be deployed within a geographic region for the purposes of transmitting geolocations or contextual information relating to members of a targeted population to be included within a geofence.

In some examples, the geofence may be defined based on movement of the population or movement of the deployed members, for example. In some examples, common elements in the received contextual information may be identified and/or monitored (on a continuous or periodic basis) to identify changes and the boundary of the geofence may be dynamically redefined accordingly.

Geofences can be used on a location-aware mobile device to detect when a user of the mobile device enters a specific location, such as a specific retail store. Geofences can be defined in terms of Global Positioning System (GPS) coordinates (e.g., latitude and longitude) combined with a radius measured in meters or feet, for example. Alternatively, geofences can also be defined according a series of GPS coordinates defining a bounding box. In yet other examples, a geofence can be any geometric shape defined by a mathematical formula and anchored by a GPS coordinate.

Mobile devices, such as an iPhone (from Apple, Inc. of Cupertino, Calif.) can monitor a number of geofences at a given time. Additionally, applications running on a mobile device commonly can update monitored geofences when the application is opened by a user (or at least active in memory on the mobile device). A concept of geofence paging has also been developed. Geofence paging can provide a benefit of limiting the amount of memory required within a mobile device for monitoring and maintaining geofences. In some examples, a plurality of geofences may be referred to as a page of geofences, with a large (parent) geofence describing the boundaries of the page and smaller (child) geofences located within the page. In an example, the mobile device moves outside of the parent geofence, the mobile device can load a new parent geofence and a plurality of child geofences associated with the parent geofence. In another example, the various parent and child geofences can be stored on the mobile device and only loaded into active memory as they are needed, based on the current location of the mobile device.

Example System

FIG. 1 is a block diagram depicting a system 100 for enabling dynamic geofencing on a mobile device, according to an example embodiment. In an example, system 100 can include users 110A-110N (collectively referred to as either user 110 or users 110 depending upon context) and a network-based publication system 120. In an example, the users 110A-110N can connect to the network-based publication system 120 via mobile devices 115A-115N (collectively referred to as mobile device 115). Users 110A-110N can also connect to the network-based publication system 120 via clients 140A-140N (collectively referred to as client 140 or clients 140).

One or more of the users 110A-110N may wish to monitor or create a dynamic geofence. In an example, the users 110 can configure an account on the network-based publication system 120. The account can be accessed by each user, such as user 110A, using mobile device 115A or client 140A, if user 110A meets the specified access criteria or rules. In an example, the access rules can include user identification and location identification rules (e.g., user must be located within a location supported by the network-based publication system 120). A user account on the network-based publication system 120 can allow the user to define specific geolocations or contextual information of interest for creating and monitoring a dynamic geofence. Based on geofence-creation criteria received from user 110A, geofences can be created based on contextual information received from and relating to other users 110B-110N.

In some examples, the network-based publication system 120 can receive contextual information from the users 110A-110N and create a dynamic geofence accordingly. In some examples, the network-based publication system 120 can monitor such received contextual information and redefine a boundary of the geofence based on changes in geo-locations or contextual information relating to the users located within the geofence or a region defined by user 110A. In certain examples, the network-based publication system 120 can be used by merchants for advertising and promotion based on contextual information received from a population of users located within a defined region. In some examples, population members can be added to or removed from the geofence based on changes in geo-locations or contextual information relating to the users located within the geofence or a region defined by user 110A.

In some examples, the network-based publication system 120 can be used by merchants for location-based advertising platforms, where users, such as users 110, opt-in to location-based advertisements. For example, Best Buy (of Minneapolis, Minn.) may use the network-based publication system 120 to provide location-based (or context based) advertising to users 110 via mobile devices 115. Best Buy may in one example deploy a number of users (mobile stations) into a geographic region to observe defined user behavior and transmit to Best Buy (or the network-based publication system 120) associated contextual information on which the boundaries of a dynamic geofence can be based. In one example, a series of geofences may be generated each encompassing a manageable number of geographically related Best Buy store locations. Each of the Best Buy store locations would be covered by a much smaller child geofence that enables the network-based publication system 120 to serve location-based (or context-based) advertising relevant to the specific Best Buy store only with of the users 110 is in geographic proximity to the Best Buy store (based on the mobile device 115 detecting a location within one of the monitored child geofences). In another example, a location-aware smart phone application running on the mobile device 115 can trigger pre-defined tasks based on detecting presence within a child geofence.

Example Operating Environment

Figure 2:
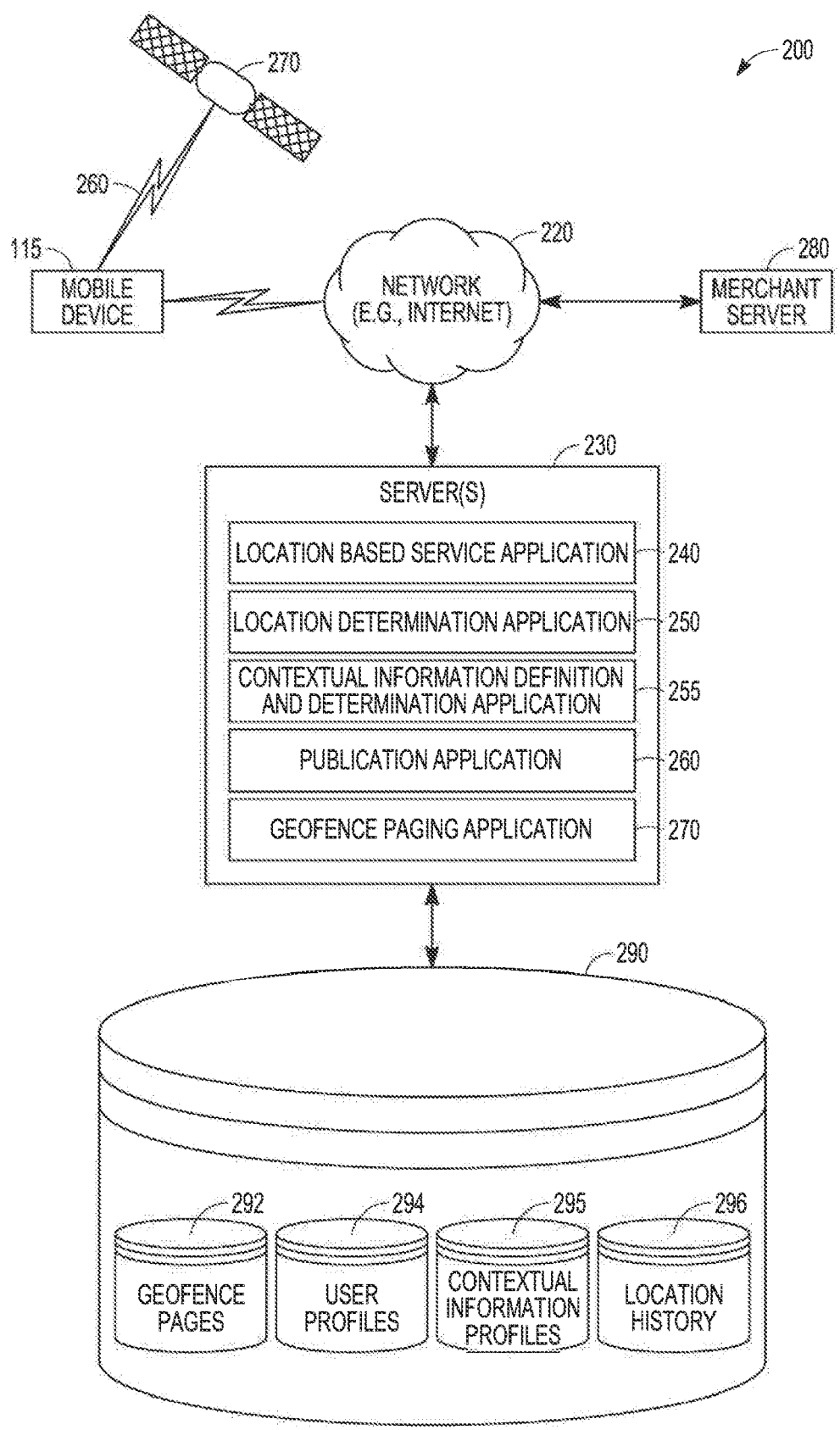
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods for using dynamic geofences can be implemented. The environment 200 can include a mobile device 115, a communication connection 210, a network 220, servers 230, a communication satellite 270, a merchant server 280, and a database 290. The servers 230 can optionally include location based service application 240, location determination application 250, contextual information definition and determination application 255, publication application 260, and geofence paging application 270. The database 290 can optionally include geofence pages 292, user profiles 294, contextual information profiles 295, and/or location history 296. The mobile device 115 represents one example device that can be utilized by a user to monitor an unlimited number of contextual information or locations via dynamic geofencing. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers may execute contextual information service applications allowing receipt and transmission of contextual information between users (mobile device 115) and/or the merchant server 280 for the purpose of creating dynamic geofences. The execution of such contextual information services may be similar to the execution of location based services (LBS) as follows. In further examples, one or more servers 230 may execute LBS applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based publication system 120, which can then be used to provide access to a group account on the network-based publication system 120. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware publication of data such as advertisements or offers. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250. In addition to examples using these various mechanisms to identify a particular location, these mechanisms (e.g., SSIDs, RFIDs, NFC, and so forth) can be used as secondary authentication factors, which are discussed in more detail below.

In certain examples, the geofence paging application 270 can leverage the LBS application 240, or the location determination application 250, or the contextual information definition and determination application 255 to assist in determining which page of geofences to transmit to the mobile device 115.

Example Mobile Device

Figure 3:
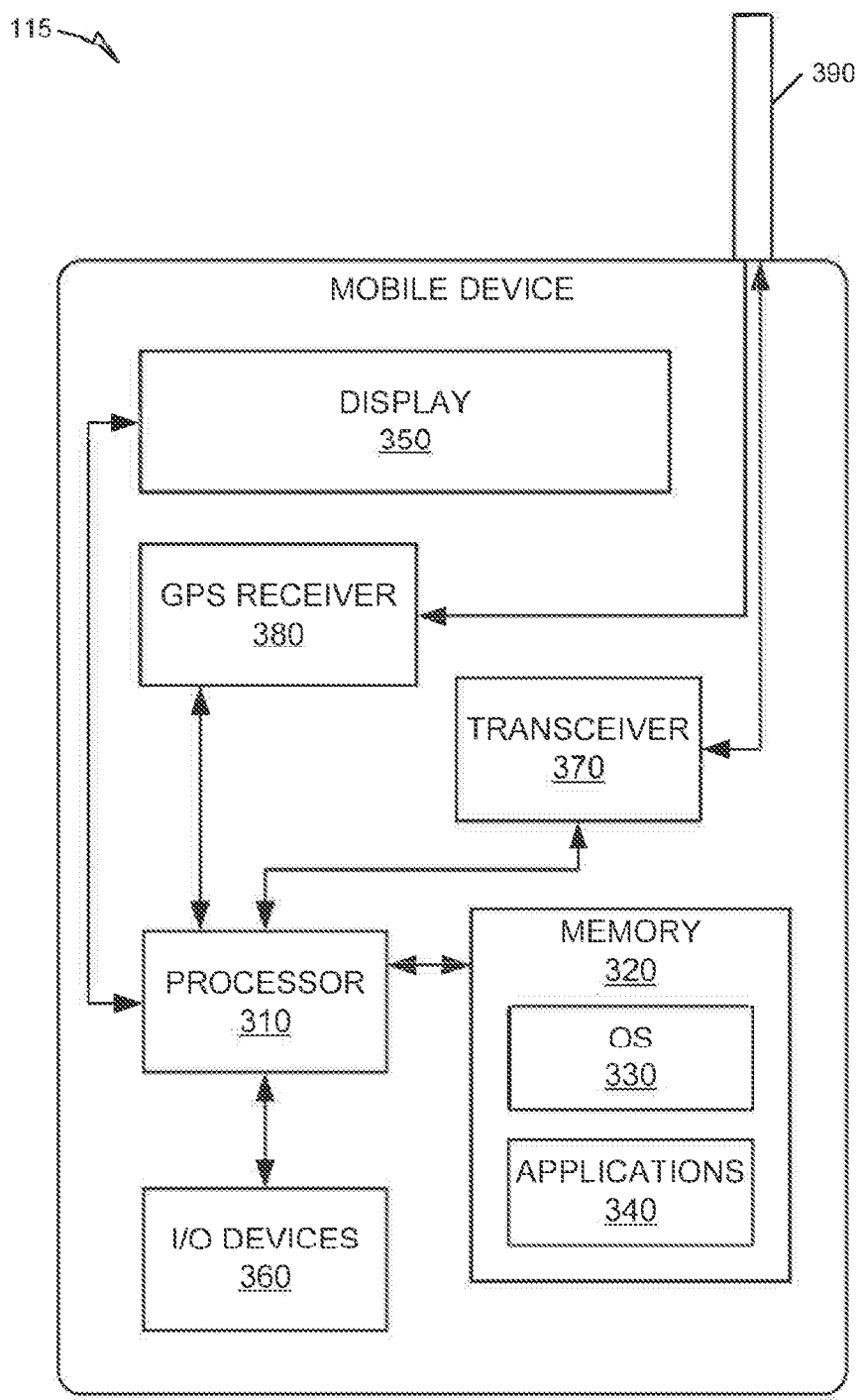
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. In certain examples, the application programs 340 can include instructions to implement dynamic geofencing, by retrieving and monitoring contextual information, as necessary based on location information. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geo-location concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, or similar purposes. Geofences can be used in conjunction with the offer generation and delivery concepts discussed herein. For example, a geofence can be created based on whether a user (or mobile device associated with the user) is within a geographic area of interest (e.g., target location) to providing access to a group account. In some examples, a geofence can be created based on whether one or more users (or mobile devices associated with the one or more users) has, or is observed to have, characteristics corresponding to a defined common element in contextual information received from and relating to the one or more users. In some examples, if the user is within a geofence established by provisioning of a group account, the systems discussed herein can use that information to authorize the user to access the group account, such as authorizing the user to process a payment against a group payment account.

Example Platform Architecture

Figure 4:
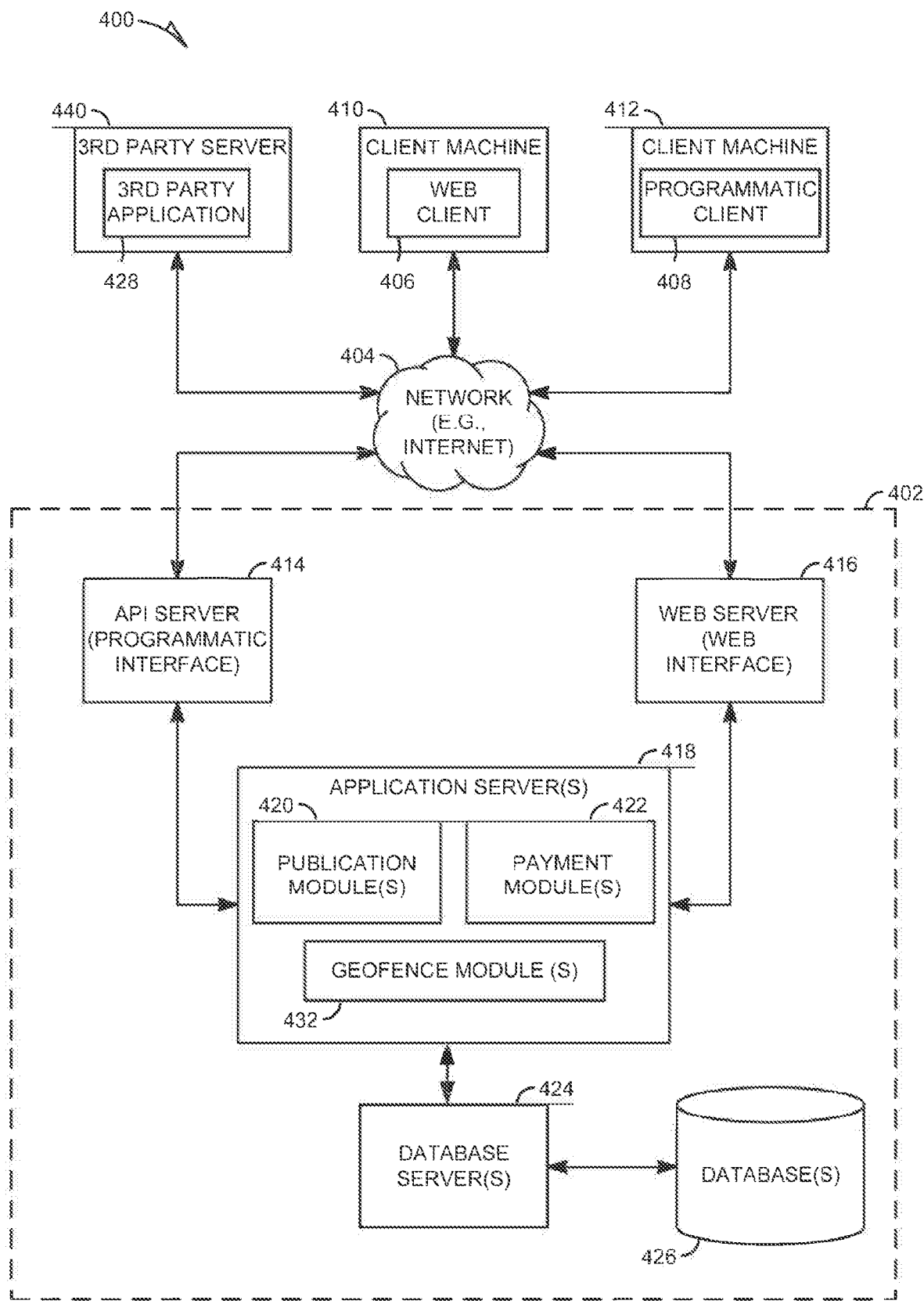
FIG. 4 is a block diagram illustrating a network-based system for creating a dynamic geofence and related services, according to example embodiments.

FIG. 4 is a block diagram illustrating a network-based system 400 within which dynamic geofencing can operate, according to an example embodiment. The block diagram depicts a network-based system 400 (in the exemplary form of a client-server system), within which an example embodiment can be deployed. A networked system 402 is shown, in the example form of a network-based location-aware publication or payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., PAYPAL payments smart phone application from PayPal, Inc. of San Jose Calif.) executing on respective client machines 410 and 412. In an example, the client machines 410 and 412 can be in the form of a mobile device, such as mobile device 115. In yet another example, the programmatic client 408 can be the RedLaser mobile shopping application from eBay, Inc. of San Jose, Calif.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and geofence modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 can also be configured to facilitate payment processing based on geofence detection and work in conjunction with the geofence modules 432. The geofence modules 432 may provide generation of parent and child geofences, among other things. The boundaries of geofences may be based on common elements identified in contextual information received via mobile devices 115 and relating to users 110A-110N. While the publication modules 420, payment modules 422, and geofence modules 432 are shown in FIG. 4 to all form part of the networked system 402, it will be appreciated that, in alternative embodiments, the payment modules 422 may form part of a payment service that is separate and distinct from the networked system 402.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and geofence modules 432 could also be implemented as standalone systems or software programs, which do not necessarily have networking capabilities.

The web client 406 accesses the various publication modules 420, payment modules 422, and geofence modules 432 via the web interface supported by the web server 416. Similarly, the programmatic client 408 accesses the various services and functions provided by the publication modules 420, payment modules 422, and geofence modules 432 via the programmatic interface provided by the API server 414. The programmatic client 408 may, for example, be a smart phone application (e.g., the PAYPAL payments application) that enables users to process payments directly from their smart phones leveraging user profile data and current location information provided by the smart phone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the geofence modules 432 for advertising or marketing purposes.

Example Geofence Modules

Figure 5:
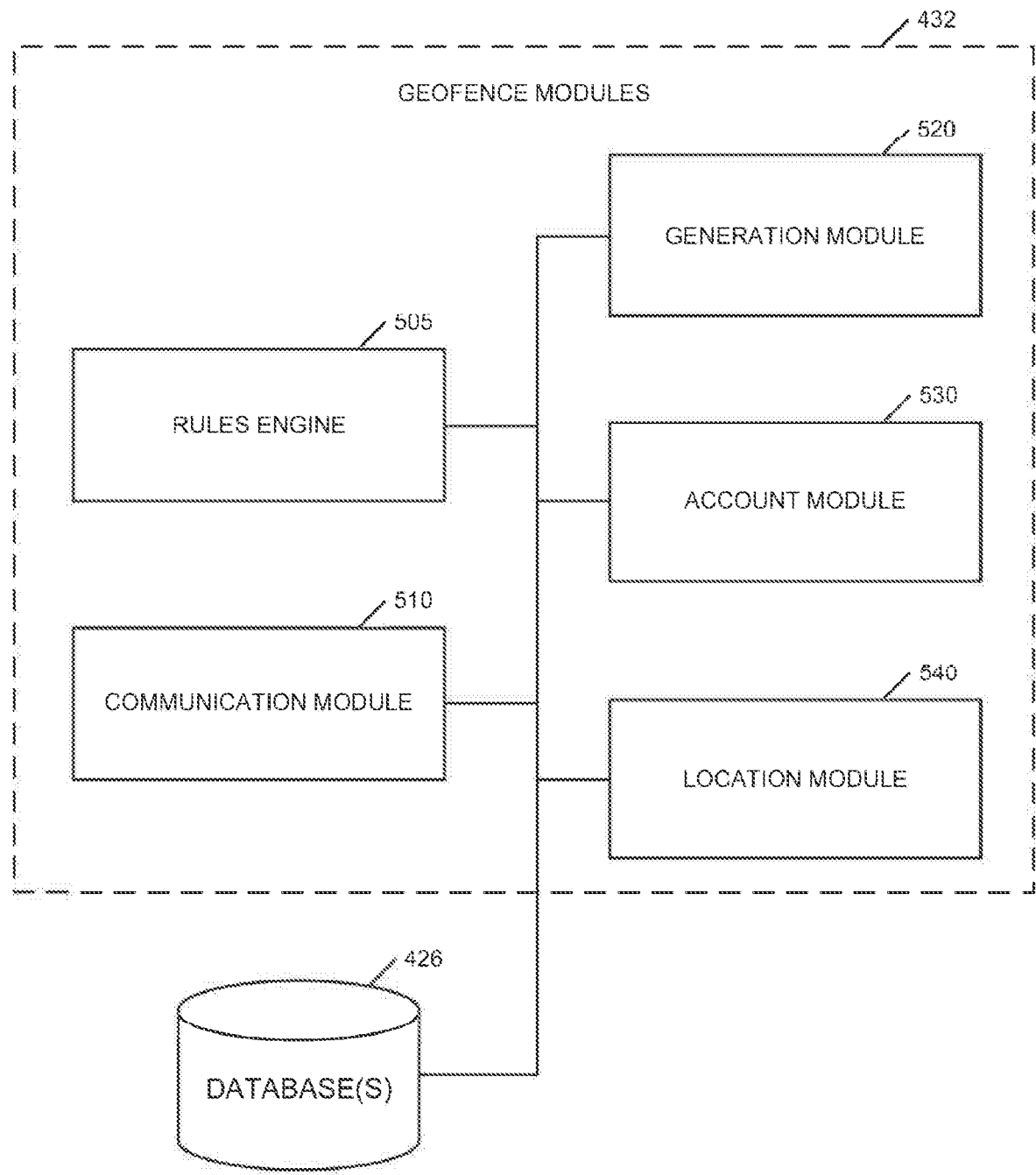
FIG. 5 is a block diagram illustrating geofence modules, according to an example embodiment.

FIG. 5 is a block diagram illustrating geofence modules 432, according to an example embodiment. In this example, the geofence modules 432 can include a rules engine 505, a communication module 510, a generation module 520, an account module 530, and a location module 540. In an example, the geofence paging modules 432 can access database 426 to store and/or retrieve generation rules, user profile data, contextual information data or profiles (including common element profiles), location data, and geofences (parent and child), as well as other information, to enable dynamic geofencing.

In an example, the rules engine 505 can be configured to manage and evaluate rules controlling contextual information and common elements identified or defined therein.

In an example, the communication module 510 can be configured to manage communications between the geofence modules 432 and a user, where the user is communicating via the mobile device 115 or the client 140. The communication module 510 can also be configured to manage communications between the geofence modules 432 and a merchant, such as payment recipient 130 communicating via the payment recipient system 132.

In an example, the generation module 520 is configured to generate parent and child geofences according to information provided by modules, such as the account module 530, the location module 540 and the rules engine 505.

In an example, the account module 530 is configured to provision (setup) and manage a user account on the networked system 402. In certain examples, the account module 530 can provision a user account according to configuration data received by the communication module 510. The account module 530 can also work in conjunction with the rules engine 505 in provisioning or decommissioning user accounts.

In an example, the location module 540 is configured to receive location data from a mobile device, such as mobile device 115, and determine from the location data a current physical location, which may include reference to landmarks or other sites of interest. In some examples, the location module 540 can receive GPS-type coordinates (e.g., longitude and latitude), which can be used to establish a current location associated with a mobile device (and, thus, a user of the mobile device). Using the longitude and latitude coordinates, the location module 540 can determine if the current location is within the current parent geofence, for example. In certain examples, the location module 540 can receive other location determining information from a mobile device, such as a photograph or scan of data only readily available at a certain physical location (generally referred to as secondary location authentication factor). In another example, some merchants may broadcast specific wireless network signals that can be received by a mobile device, such as mobile device 115. Once received, the mobile device 115 can include programming or circuitry to translate the signal into a specific location, or the mobile device 115 can simply retransmit the unique signal to the location module 540. In an example, a merchant location can transmit a unique SSID, which the location module can be programmed to interpret as identifying a specific merchant location. In another example, the merchant may broadcast a unique SSID within all of its locations and the location module 540 can be programmed to use a combination of the unique SSID and other location data (e.g., GPS coordinates or cell tower locations) to identify a specific location Additional details regarding the functionality provided by the systems and modules described herein are detailed below in reference to FIGS. 6-7.

Example Methods

Figure 6:
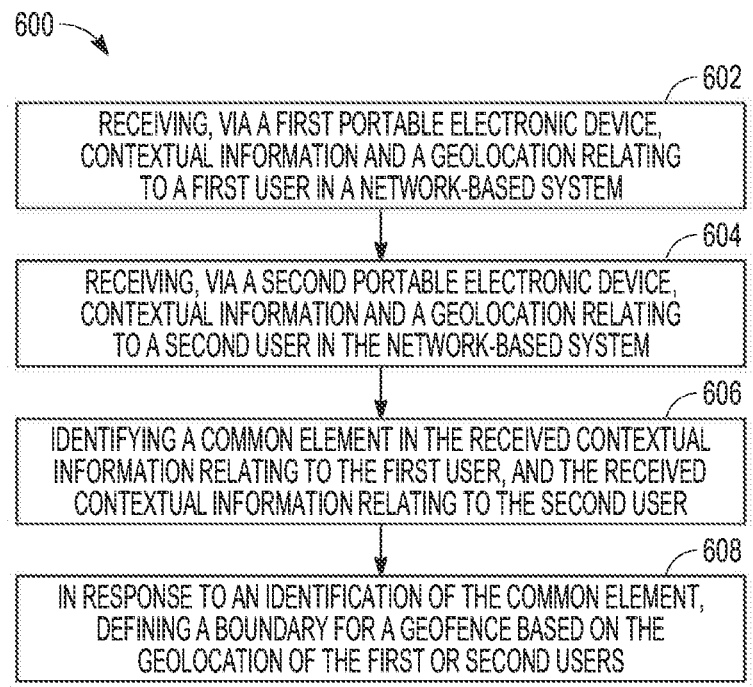
FIG. 6 is a flowchart illustrating a method for enabling a dynamic geofence according to an example embodiment.
Figure 7:
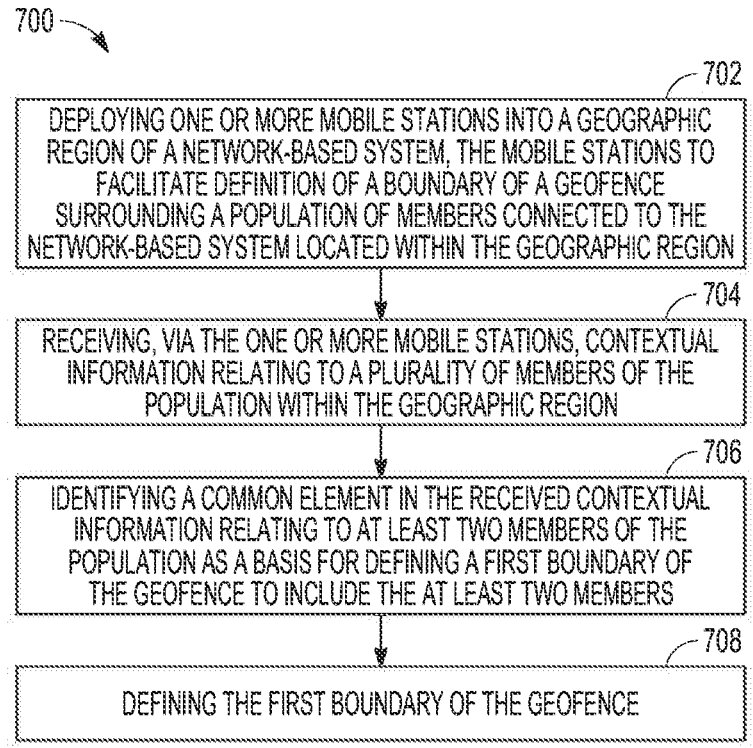
FIG. 7 is a flowchart illustrating a method for enabling a dynamic geofence according to an example embodiment.

FIGS. 6-7 illustrate example methods for enabling dynamic geofencing. Some portions of the methods may be performed by processing logic that may comprise hardware (e.g., dedicated logic, programmable logic, microcode, etc.), software (such as that which may be run on a general-purpose computer system or a dedicated machine), or a combination of both.

In one example embodiment, the processing logic resides at the geofence module 432, illustrated in FIG. 4. Some portions of the methods may be performed by the various example modules discussed above with reference to FIG. 4. Each of these modules may comprise processing logic.

FIG. 6 is a flowchart illustrating a method 600 for enabling dynamic geofencing, according to an example embodiment. The method may be implemented, at least in part, on a mobile device 115 (also termed a portable electronic device in this specification). In an example, the method 600 can include: at 602, receiving, via a first portable electronic device, contextual information and a geolocation relating to a first user in a network-based system; at 604, receiving, via a second portable electronic device, contextual information and a geolocation relating to a second user in the network-based system; at 606, identifying a common element in the received contextual information relating to the first user, and the received contextual information relating to the second user; and at 608, in response to an identification of the common element, defining a boundary for a geofence based on the geolocation of the first or second users.

In some examples, the common element is a predetermined common element. In some examples, the common element is identified upon a comparison of the first and second contextual information. The method 600 may further comprise monitoring an aspect of the common element included in the received first or second contextual information and adjusting the boundary of the geofence based on a change in the aspect. In some examples, the method further comprises monitoring the geolocation of the first or second user and adjusting the boundary of the geofence based on a change in the geolocation.

In some examples, the method 600 further comprises identifying a population size of members connected to the network-based system to be included within the defined geofence, the population size based on an identification of the common element in received contextual information relating to at least one member of the population and the received contextual information relating to the first or second user. The first and second users may be included in the population. The boundary of the geofence may be defined in some examples based on a geolocation of the at least one member. In some examples, the method 600 further comprises monitoring the contextual information relating to the first or second user or the at least one member, and redefining the boundary of the geofence based on a change in the contextual information or a desired population size to be included with the geofence.

The method 600 may further comprise redefining the boundary of the geofence based on a change in the geolocation or the contextual information relating to at least one member of the population, or to the first or second user. In some examples, the method 600 may further comprise redefining the boundary of the geofence to exclude at least one member from the population, the exclusion based on an identified change in geolocation or contextual information relating to the at least one excluded member. In some examples, the method 600 may further comprise redefining the boundary of the geofence to include at least one new member in the population, the inclusion based on a geolocation of the at least one new member, or an identification of a common element in received contextual information relating to the at least one new member and the contextual information relating to at least one other member of the population.

The method 600 may further comprise monitoring the contextual information or geolocation relating to the first or second user, and dynamically redefining the boundaries of the geofence based on movement of the first or second user within a geographic region of the networked-based system, or an identified change in the contextual information relating to the first or second user. In some examples, the method 600 further comprise defining a boundary for the geofence based on a predetermined distance between the respective geolocations of the first and second user.

FIG. 7 is a flowchart illustrating a method 700 for dynamic geofencing, according to an example embodiment. The method may be implemented, at least in part, on a mobile device 115 (also termed a portable electronic device in this specification). In an example, the method 700 can include: at 702, deploying one or more mobile stations into a geographic region of a network-based system, the mobile stations to facilitate definition of a boundary of a geofence surrounding a population of members connected to the network-based system located within the geographic region; at 704, receiving, via the one or more mobile stations, contextual information relating to a plurality of members of the population within the geographic region; at 706, identifying a common element in the received contextual information relating to at least two members of the population as a basis for defining a first boundary of the geofence to include the at least two members; and at 708, defining the first boundary of the geofence.

In some examples, defining the first boundary of the geofence is further based on a geolocation of at least one of the member of the population. In some examples, defining the first boundary of the geofence is further based on a geolocation of at least one mobile station. In some examples, redefining the boundary of the geofence is based on a desired number of members of the population to be included with the geofence.

The method 700 may further comprise defining a second boundary of the geofence based on a change in geolocation of at least one member of the population, or of the one or more mobile stations. The method 700 may further comprise defining a second boundary of the geofence based on a change in received contextual information relating to at least one member of the population. In some examples, the method 700 may further comprise redefining the boundary of the geofence to exclude at least one member from the population, based on an identified change in geolocation or received contextual information of the at least one excluded member. In some examples, the method 700 further comprises redefining the boundary of the geofence to include at least one new member to the population, the inclusion based on a geolocation of the at least one new member, or an identification of a common element in received contextual information relating to the at least one new member and the contextual information relating to at least one other member of the population. In some examples, the one or more deployed mobile stations are in communication with each other.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
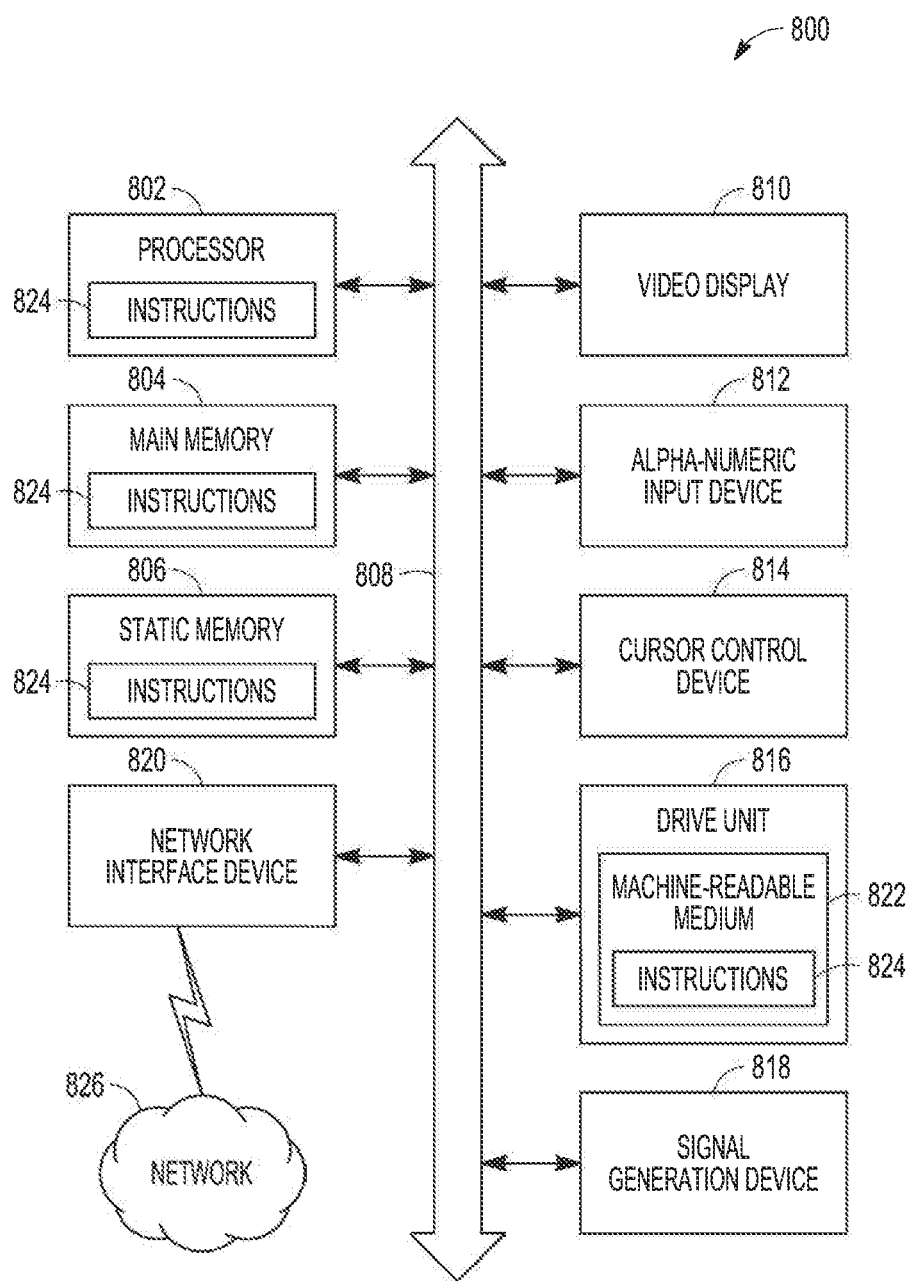
FIG. 8 is a diagrammatic representation of a machine in the example form of a computer system within which a set of instructions for causing the machine to perform any one or more of the methodologies discussed herein may be executed.

FIG. 8 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or used by any one or more of the methodologies or functions described herein. The instructions 824 may also reside, completely or at least partially, within the main memory 804, static memory 806, and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible media to facilitate communication of such software.

Non-Limiting Embodiments

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving contextual information and geographic location data relating to a plurality of members of a population within a geographic region, the contextual information further relating to a mobile device associated with a first member of the plurality of members of the population;
   identifying a common element in the received contextual information relating to the first member and a second member of the population as a basis for defining a boundary of a geofence;

determining, based on the common element, a specified population size of members to be included within the geofence;

defining the boundary of the geofence based on the specified population size and the geographic location data; and causing a task to be performed on the mobile device based on detecting that the mobile device is within the geofence.

2. A method as recited in claim 1, wherein the contextual information comprises one or more environmental conditions relating to the plurality of members of the population.

3. A method as recited in claim 1, wherein the contextual information identifies one or more of a current activity pertaining to the first member and the second member, or a past activity pertaining to the first member and the second member.

4. A method as recited in claim 1, wherein the contextual information identifies an event that is attended by one or more of the members of the population, and wherein the common element indicates that the first member and the second member are attending the event.

5. A method as recited in claim 1, wherein the common element comprises a common user attribute included in the contextual information, the specified population size is based on a defined number of recipients having the common user attribute specified for an instance of content, and wherein said causing the task to be performed comprises causing the instance of content to be delivered to the mobile device.

6. A method as recited in claim 1, wherein said identifying the common element comprises comparing the received contextual information from the first member and the second member to a defined range of contextual information, and determining that common element occurs within the defined range.

7. A method as recited in claim 1, wherein said defining further comprises defining the boundary of the geofence based on a specified density of members.

8. A method as recited in claim 1, wherein said defining the boundary of the geofence comprises one or more of defining the boundary of the geofence as a set of geographical coordinates, or defining the boundary of the geofence as a bounding box of geographical coordinates.

9. A method as recited in claim 1, wherein said defining the boundary of the geofence comprises defining the boundary of the geofence as a geometric shape anchored by one or more geographic coordinates.

10. A method as recited in claim 1, wherein said defining the boundary of the geofence further comprises defining the boundary to exclude at least one other member of the population.

11. A method as recited in claim 1, further comprising:
receiving an indication of a change in the contextual information relating to the second member of the population; and
redefining the boundary of the geofence to exclude the second member.

12. A system comprising:
one or more processors; and
a machine readable memory device including instructions that are executable by the one or more processors to perform operations including:
identifying a common element in received contextual information relating to a first member and a second member of a population as a basis for defining a boundary of a geofence;

determining, based on the common element, a specified population size of members to be included within the geofence;
defining the boundary of the geofence based on the specified population size; and
causing a task to be performed on a mobile device based on detecting that the mobile device is within the geofence.

13. A system as recited in claim 12, wherein said defining the boundary of the geofence comprises one or more of:
defining the boundary of the geofence as a set of geographical coordinates; or
defining the boundary of the geofence as a bounding box of geographical coordinates.

14. A system as recited in claim 12, wherein said defining the boundary of the geofence further comprises defining the boundary to exclude the first member of the population based on detecting a change in one or more of a geolocation of the first member or the contextual information relating to the first member.

15. A system as recited in claim 12, wherein the operations further include:
receiving further contextual information relating to a third member of the population;
identifying the common element in the further contextual information; and
redefining the boundary of the geofence to include the third member.

16. A system as recited in claim 12, wherein the task comprises authorizing one or more of the first member or the second member for access to a group account.

17. A system as recited in claim 12, wherein the operations further include receiving geographical location data pertaining to the first member and the second member, and wherein the task comprises delivering an instance of content targeted to a location identified by the geographical location data to the mobile device.

18. A method comprising:
identifying a common element in received contextual information relating to a first member and a second member of a population as a basis for defining a boundary of a geofence;
determining, based on the common element and a specified target population for an instance of content, a specified population size of members to be included within the geofence;
defining the boundary of the geofence based on the specified population size; and
causing the instance of content to be delivered to a mobile device based on detecting that the mobile device is within the geofence.

19. A method as recited in claim 18, further comprising:
receiving geographical location data pertaining the first member and second member; and
identifying a geographical location indicated by the geographical location data, wherein said causing the instance of content to be delivered to the mobile device is based on the instance of content being targeted to the geographical location.

20. A method as recited in claim 18, further comprising receiving geographical location data pertaining the first member and second member, wherein said defining the boundary is based on a set of geographic coordinates included in the geographical location data.

* * * * *